May 13, 1958

J. R. SNYDER 2,834,613

QUICK DISCONNECT COUPLING

Filed Sept. 6, 1955

Inventor
Jacob Rush Snyder

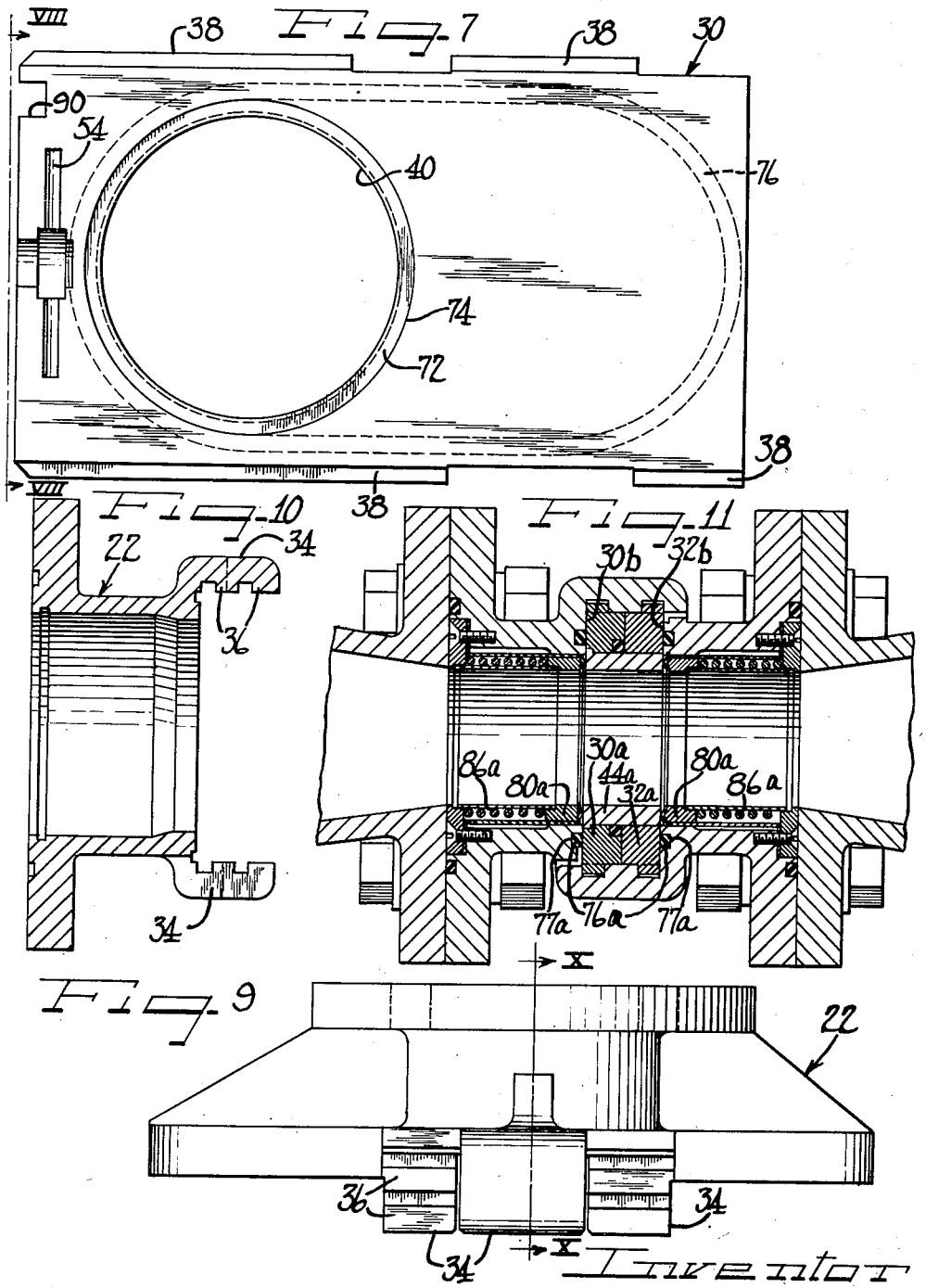

United States Patent Office 2,834,613  
Patented May 13, 1958

2,834,613

QUICK DISCONNECT COUPLING

Jacob Rush Snyder, Cleveland, Ohio, assignor to Thompson Products, Inc., Cleveland, Ohio, a corporation of Ohio Application September 6, 1955, Serial No. 532,597

8 Claims. (Cl. 284—11)

This invention relates to self-sealing couplings adapted for quick and easy operation while automatically sealing the coupling parts when these coupling parts are detached from each other.

More particularly, the present invention relates to a device for coupling together the ends of fluid conduits such, for example, as tubes, pipes, hoses, and the like, to place those conduit ends in unrestricted communication with each other when they are coupled together, and to seal those conduit ends when the conduits are uncoupled.

In such a device, complementary coupling parts or boxes are adapted to receive the ends of the fluid conduits which are to be coupled together. A shiftable valve member comprising a multiple number of parts is provided to detachably interconnect the coupling boxes and to control fluid flow between the fluid conduits connected to those boxes. One of the parts of the valve member is retained in each of the coupling boxes in a conduit-closing position, to seal it and prevent leakage or drainage of the fluid out of it when the conduits are separated.

A major consideration of such a coupling is the prevention of leakage. The problem of the prevention of leakage exists in both the coupled and the separated condition of the coupling boxes, and during the operation of coupling and uncoupling associated boxes.

Thus, an object of the present invention is to provide novel and improved means preventing leakage in quick disconnect couplings of the general type indicated above.

Another object is to provide a novel quick disconnect coupling adapted to prevent leakage during the period of relative movement of its shiftable members as they are shifted during the operations of coupling and uncoupling associated boxes, thereby preventing squirting and leakage.

Another object of the present invention is the provision of new and improved means for causing the valve plates to shift to and between their conduit closing position and their conduit communicating position.

Another object is to provide a quick disconnect coupling of new and improved construction, which is simple and economical to manufacture, which will be readily operable, and which will give good service over long periods of use.

Other objects, advantages and novel features, for the specific and general improvement of quick-disconnect couplings of the general type indicated, will be readily apparent to those skilled in the art from the following detailed description of certain preferred embodiments thereof, taken in conjunction with the accompanying drawings, in which:

Figure 5 is an elevational view of one of the shiftable valve members of the device of Figure 1;

Figure 6 is an end view, on an enlarged scale, of the valve member shown in Figure 5, and taken along the line VI—VI of Figure 5;

Figure 7 is an elevational view of the other shiftable valve member of the device of Figure 1;

Figure 8 is an end view, on an enlarged scale, of the valve member shown in Figure 7 and taken along the line VIII—VIII of Figure 7;

Figure 9 is a plan view of one of the coupling boxes shown in Figure 1;

Figure 10 is a longitudinal cross sectional view of the coupling box of Figure 9, and taken along the line X—X of Figure 9; and Figure 11 is a longitudinal cross section, similar to Figure 3, but showing another preferred embodiment of my invention.

Figure 1:
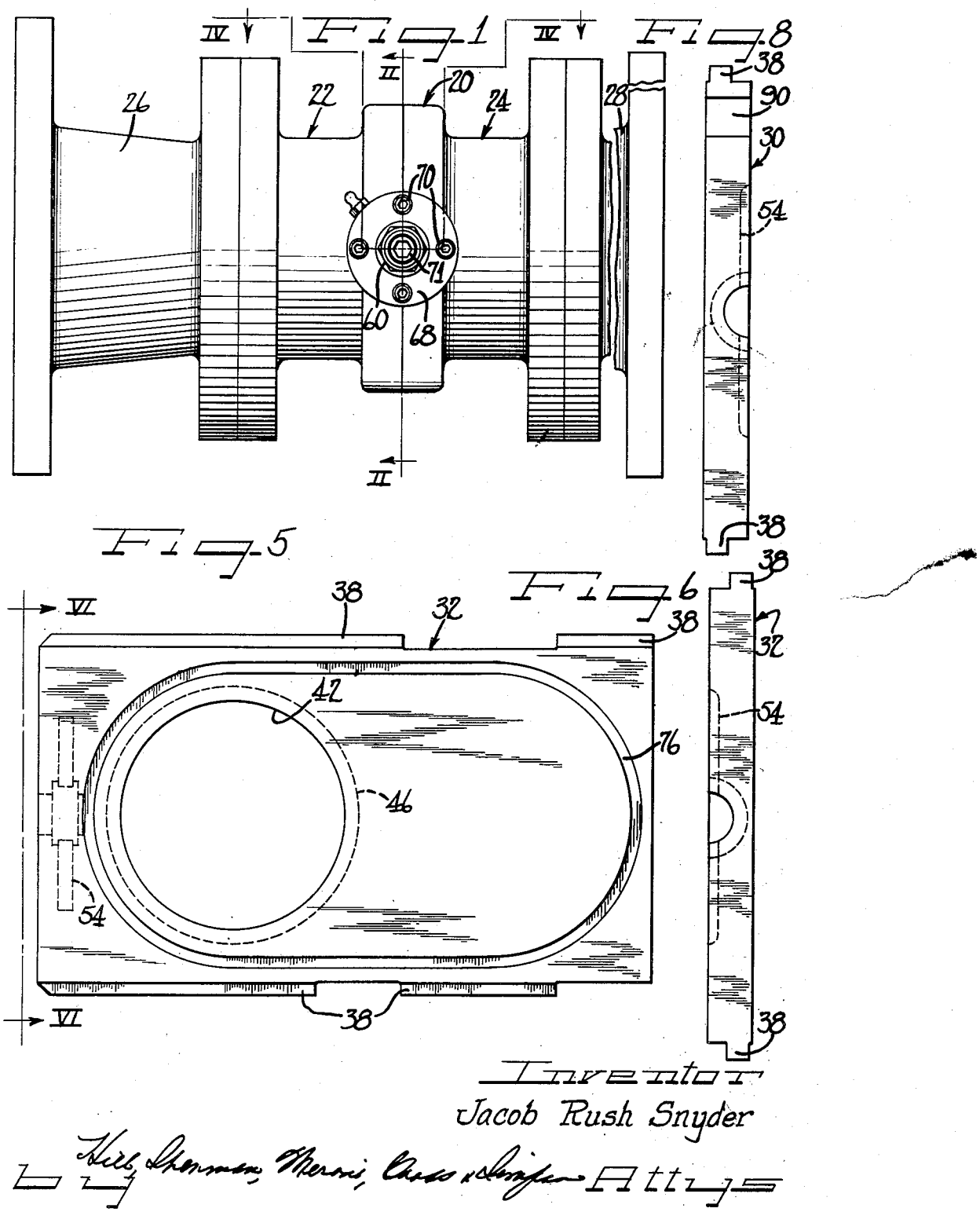
Figure 1 is a side elevational view of a coupling according to a preferred embodiment of my invention.

As shown in the drawings, the quick disconnect coupling unit 20 comprises a pair of coupling boxes 22 and 24, which are adapted to interconnect, in a manner hereinafter described, a pair of fluid conduits 26 and 28, respectively. For providing the desired coupled relation of conduits 26—28, in which free flow communication between them is provided, and an uncoupled relation of the conduits 26—28, in which each is separately sealed, there is provided a shiftable valve means such as the pair of juxtaposed slidable valve-plates 30 and 32 shown. Such a coupling unit is generally of the type shown and described in my U. S. Patent No. 2,399,516, issued April 30, 1946.

The coupling boxes 22 and 24 may be substantially identical in construction and design. Each includes forwardly extending hook-like portions such as the fingers 34 which carry flanges 36 arranged in selected staggered spacing or pattern adapted to slidably carry not only its associated one of the valve plates 30—32, but to register with and overlie portions of the other of such valve plates 30—32 to block disassociation of the coupling boxes 22—24 at positions other than that in which each valve plate 30—32 is in closure position sealing off its associated coupling box 22—24. That interfitting relationship prevents the boxes from being uncoupled except when their ends are separately sealed. Cooperating to produce that interfitting relationship are flanges 38 carried by the valve plates 30—32 in a coordinated staggered pattern such as is shown, which flanges 38 slidably are carried by the associated coupling box 22—24, and which act to block separating movement of the opposite coupling box. Such an interfitting arrangement is generally shown by my aforesaid patent.

For providing for the fluid flow communication between coupling boxes 22—24, the valve plates 30—32 are provided with aligned flow-openings 40—42 registering with each other and with the flow openings in the coupling boxes. One of such valve plate openings, here shown as opening 40 of valve plate 30, is desirably larger than the opening 42 in the other valve plate. Fitted in the larger opening 40, and located with respect thereto by interengaging flange means such as a flange 43 engaging a shoulder 43a of plate 30 about opening 40, is a bushing 44 which extends through plate 30 forwardly and interfits with an enlargement 46 of the opening 42 of plate 32. That interfit serves to partially seal fluid flow between the juxtaposed surfaces of the two valve plates, and also acts as a means to inter-relate the two valve plates for associated movement.

The means for moving the valve plates 30—32 to selectively locate them in conduit-open position in which the interengaging flanges 36—38 prevent separation of the coupling boxes, and a conduit-sealed position in which the flanges 36—38 have been so relatively moved as to permit the coupling boxes to be separated, will now be described.

Figure 2:
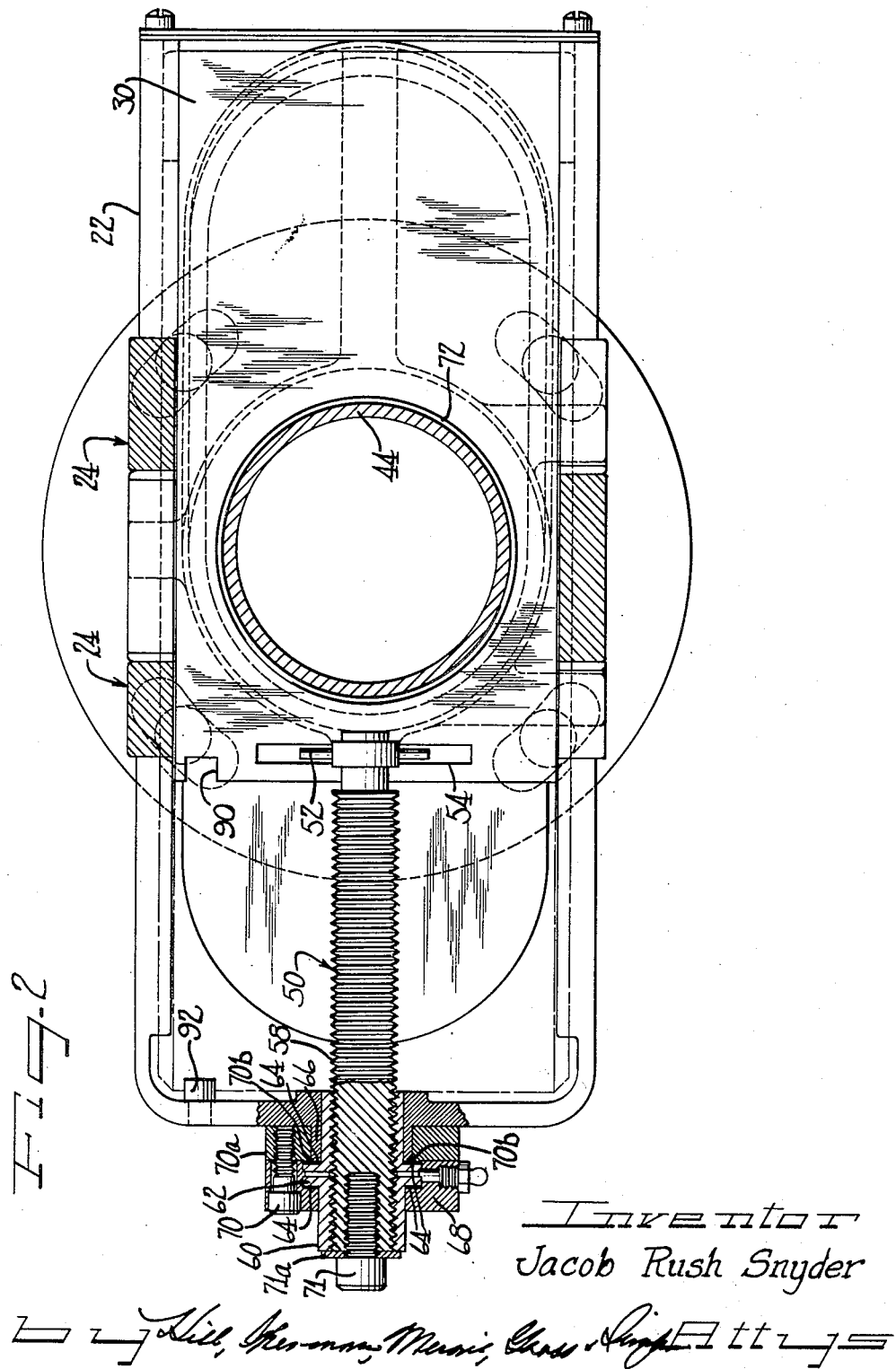
Figure 2 is a transverse cross sectional view, taken generally along the line II—II of Figure 1, showing in full lines the valve member in an operative position providing flow-communication between the coupled conduits and in chain lines indicating a retracted position blocking such flow.
Figure 4:
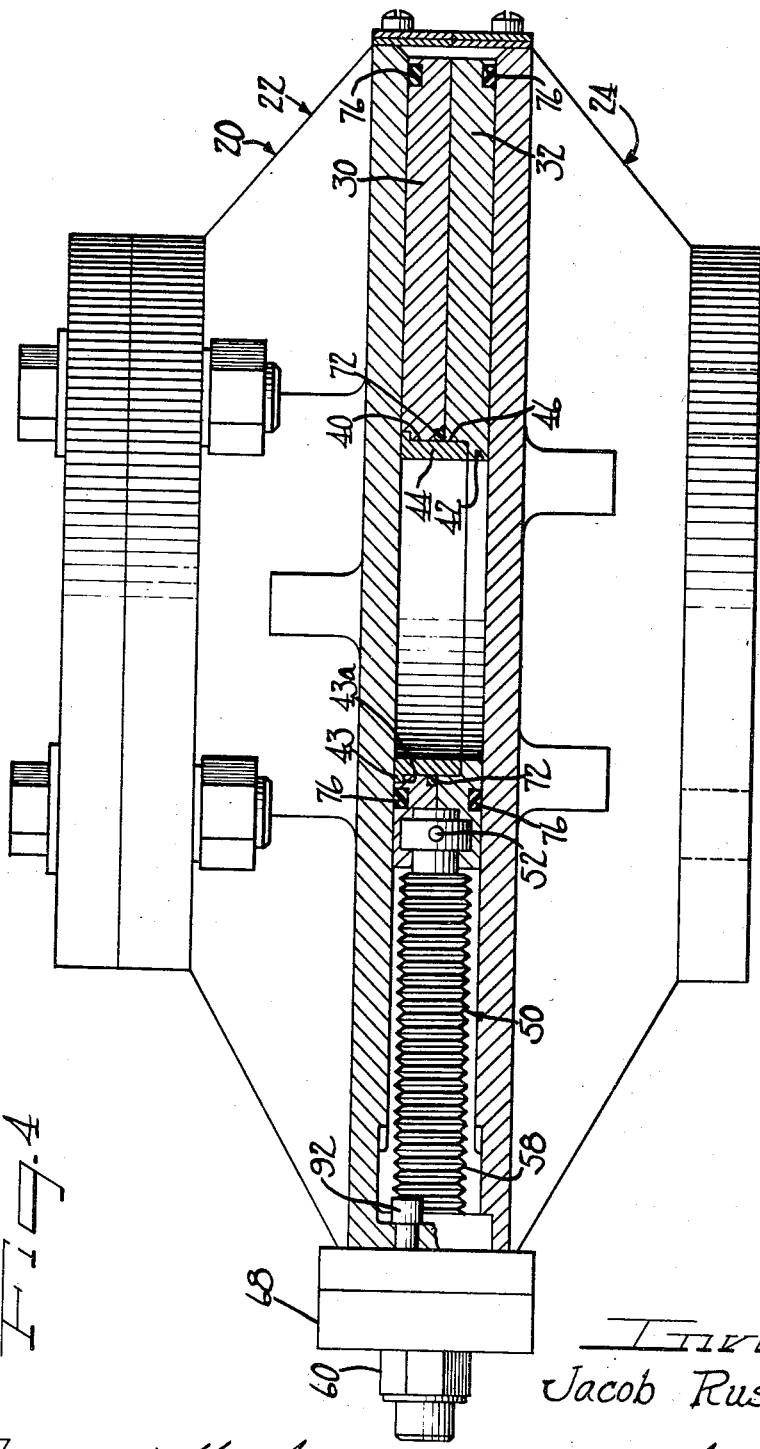
Figure 4 is a top plan view of the device shown in Figure 1, parts being shown in section, along the line IV—IV of Figure 1 and with end conduits removed.

Shown best in Figures 2 and 4, in one preferred embodiment a control member such as shaft or rod 50 carries lug means such as pin 52 for abuttingly engaging the valve plates 30—32. To accommodate pin 52, each valve plate 30—32 is shown as provided with a milled slot 54 in its mating surface, with the two slots 54 being juxtaposed to form a channel adapted to receive the pin 52. That pin 52 abuts the associated channel surfaces 54 to make the valve-plates 30—32 responsive to movement of control rod 50.

For moving rod 50 to effectuate a movement of the valve-plates, the rod is threaded as by threads 58 engaging an internally threaded collar 60 carried for rotary movement by one of the coupling boxes 30—32. As shown, the collar is adapted for such rotary control movement by being provided with thrust means such as an annular flange 62 adapted to engage associated thrust means carried by the coupling box, the latter means desirably including hardened washers 64 one of which lies against a boss 66 carried by the coupling box, and the other of which lies against a retainer plate 68 held to the coupling box as by cap screws 70 threaded into a holding disc 70a fixed to the coupling box as by weld 70b between disk 70a and the coupling box boss 66. All mating surfaces having relative movement are desirably hardened. In the embodiment just indicated, rotation of collar 60 acts through rod 50 to move the valve-plates 30—32 to their desired position. The flow-permitting position of the valve plates is accurately provided by abutment means such as a washer 71a held to the end of rod 50 by a screw 71, the washer serving as a blocker lug or abutment engageable with collar 60 to prevent further rotation of the collar 60 at the precise position of open-flow valve-plate adjustment.

A primary purpose of the present invention is the provision of improved means for sealing to prevent fluid flow past relatively movable surfaces. To this end, in the embodiment indicated in Figures 1 through 10, bushing 44 extends across the plane of the mating surfaces of valve-plates 30—32 to block direct flow at their plane of contact. Additionally, resilient sealing means are provided between such surfaces, such as the gasket 72 carried in an annular recess 74 provided in one such surface. It should be noted that this sealing means 72 serves a double purpose in sealing two sets of mating surfaces. Since it is located at the peripheral intersection of the plane of mating of the pair of mating surfaces of slide valves 30—32, with the mating surfaces of the outer wall of bushing 44 and the wall of the opening 40 in which the bushing is received, the single sealing means 72 effectuates a seal for each of the two pairs of mating surfaces.

The outwardly-facing surfaces of valve plates 30—32, and the adjacent wall of the respective one of coupling boxes 22—24 are also provided with resilient sealing means. Such means comprises resilient gasket 76; and as indicated in Figures 2, 5 and 7, each gasket 76 and the recess in which it is carried are desirably at least twice as long as the flow-opening in the mating coupling-box surface to provide a sealing encirclement of that opening irrespective of the relative disposition of the valve plate and coupling box.

Further sealing means are desirably employed. As indicated best in Figure 3, the bore 78 of each coupling box 22—24 is somewhat larger than valve-plate opening 42 and the opening of bushing 44, and in bore 78 is fitted a sealing ring 80 at least the portion of which engages the associated valve plate 30—32 being resilient to effectuate a seal. As shown, each ring 80 is composed of two parts, one of which 80a is fairly rigid and carries a fairly resilient sealing ring 80b on its inward face.

For sealing the mating surfaces of sealing ring 80 and the associated coupling box bore 78, those surfaces are coordinated to provide an annular recess of wedge-shaped section, indicated at 82. That recess 82 tapers towards the associated valve plate, and in the recess is disposed a ringlike gasket 84. Urging that gasket 84 into tight sealing relationship with the walls it seals are spring means 86 which resiliently urge gasket 84 into the recess 82. As shown, each spring means comprise a coil compression spring axially disposed in the bore of each coupling box 22—24, the spring bottomed against a retainer ring 87 held axially by a retainer ring or rings 87a fixed in the bore 78. It is to be noted that at least substantially all portions of spring 86 lie outwardly of the axial projection of the valve plate openings. A sleeve 88 is carried by each coupling box coaxially with the conduit-flow opening provided therein and as shown is of sufficient diameter to be at least substantially flush with and tangent to that opening, with the spring means 86 being disposed between the sleeve 88 and the surrounding interior surface of the coupling box. Thereby ease of flow past the coupling is not impeded.

The force exerted by the spring 86 as it forces gasket 84 into recess 82 performs the additional function of urging the associated sealing ring 80 into tight sealing relationship with the part next in line and against which it seals. In the embodiment shown in Figures 1 through 10, the parts against which the respective sealing rings 80 seal are the bushing 44 and the valve plate 32, respectively. However, in another preferred embodiment, as indicated by Figure 11, the two sealing rings 80a are urged by the spring means 86a respectively against the opposite ends of an elongated bushing 44a which extends across both of the valve plates 30a—32a.

Figure 3:
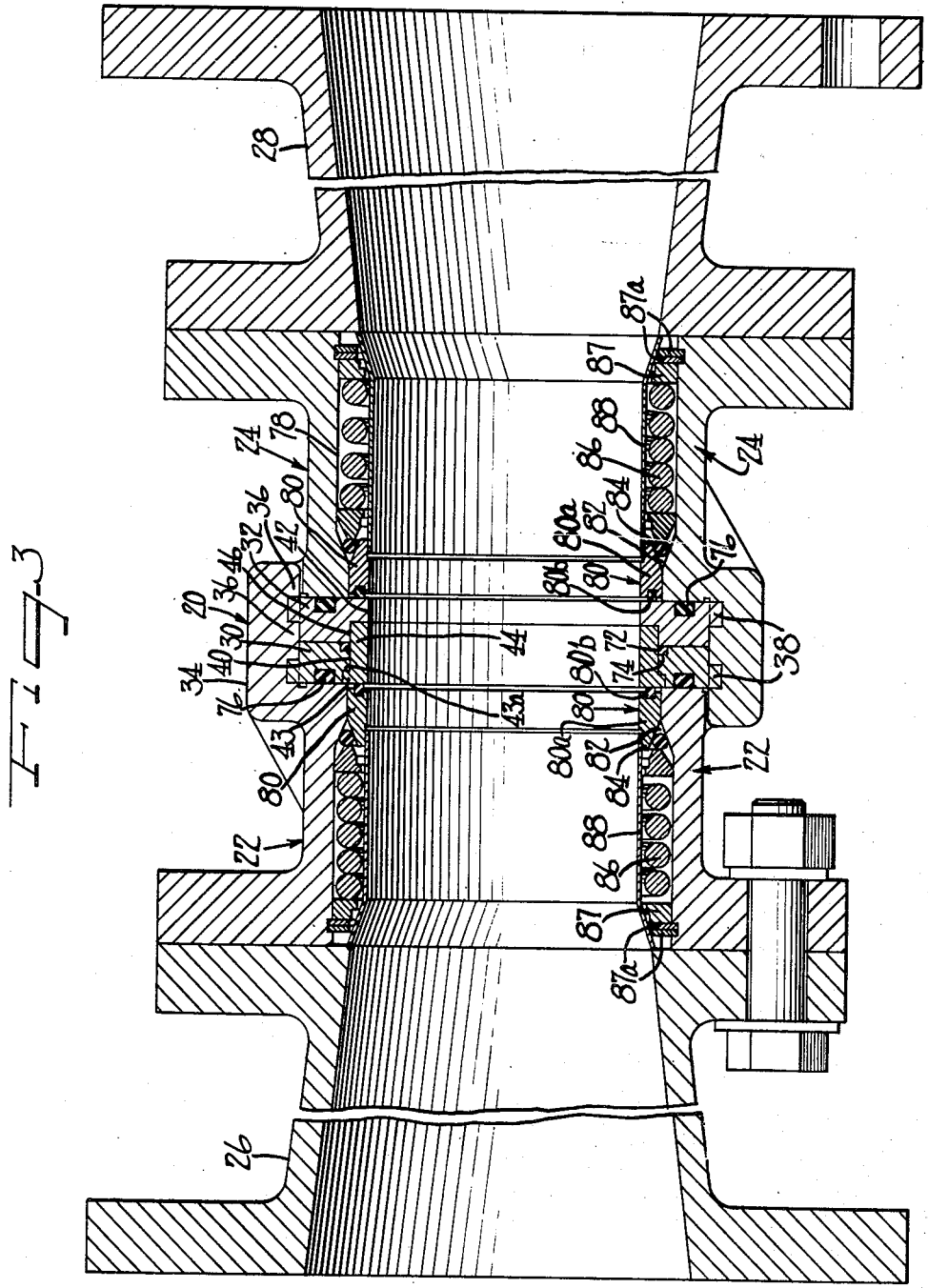
Figure 3 is a longitudinal cross sectional view of the device shown in Figure 1.

An advantageous seal between the valve plates and the adjacent surfaces of the coupling boxes is indicated in Figure 11, where as an alternative to the gasket means 76 of Figure 3, the outer surface 30b—32b of each valve plates 30a—32a is provided with a ground finish, and a sealing ring 76a is provided in a recess 77a provided in the adjacent coupling wall surface. This arrangement is expeditious in that it permits the coupling box to be formed of an unfinished casting, and permits the grinding operation to be performed conveniently on the flat valve plate 30a—32a.

Like gasket 76, gasket 76a is desirably at least twice as long as the flow-opening in the associated valve plate 30a—32a to provide a sealing encirclement of that opening irrespective of the relative disposition of the valve plate and coupling-box.

Figures 2 and 7 indicate a means assuring correct assembly of the slide plates 30—32 in their respective boxes. As there indicated, one of the coupling boxes 22—24, specifically box 22, in the embodiment shown, and its associated valve plate 30, are provided with cooperating registry means permitting association of the correct plate 30 with that coupling box 22 but blocking assembly of the other plate 32 with that box 22. Such means comprise an accommodating recess 90 provided at one end of plate 30. This recess 90 is adapted to receive a registering means, such as the lug or boss 92 shown, carried by box 22 in the path of the plate 30. Since it is provided with the cooperating recess 90, plate 30 will be accepted; however the other plate 32, which is not so provided is blocked against full assembly. Thus, the operator is warned against incorrect assembly of one of two otherwise generally identically-appearing members.

It will thus be seen from the foregoing description considered in conjunction with the accompanying drawings, that the present invention provides a new and improved quick-disconnect coupling having novel and effecting sealing means and other features, having the desired advantages and characteristics, and accomplishing its intended objects, including those hereinbefore pointed out and others inherent in the invention as described.

It will be understood that modifications and variations may be effected without departing from the scope of the novel concepts of the present invention.

I claim as my invention:

1. In a detachable coupling comprising first and second detachably connected coupling boxes defining a conduit for fluid flow communication therebetween, a multiple-part valve member including first and second slidable valve plates respectively carried by and laterally shiftable in said boxes in and between a conduit closing position in which portions thereof seal off the ends of said conduit whereupon said boxes may be detached one from another, and a conduit-communicating position in which openings provided in said plates register with one another and with said conduit to permit fluid flow through said coupling, a bushing carried by said first plate and having a forward portion projecting ahead of said first plate to be received within the said opening provided in said second plate, the opening of said first plate in the face thereof remote from said second plate being enlarged, and the said bushing having a flange means disposed in said enlarged opening to present a shoulder limiting approach of said bushing toward the second plate, and flange means carried by said bushing and adapted to engage a portion of said first plate to locate said bushing with respect to said first plate.

2. In a detachable coupling comprising first and second detachably connected coupling boxes defining a conduit for fluid flow communication therebetween, a multiple-part valve member including first and second slidable valve plates respectively carried by and laterally shiftable in said boxes in and between a conduit-closing position in which portions thereof seal off the ends of said conduit whereupon said boxes may be detached one from another, and a conduit-communicating position in which openings provided in said plates register with one another and with said conduit to permit fluid flow through said coupling, a bushing carried by said first plate and having a forward portion projecting ahead of said first plate to be received within the said opening provided in said second plate, the opening of said first plate in the face thereof remote from said second plate being enlarged, said bushing having a flange means disposed in said enlarged opening to present a shoulder limiting approach of said bushing toward the second plate, a boss secured to said first coupling box, a retaining ring, a rotatable internally threaded collar supported in fixed translational relationship relative to said first coupling box between said boss and retaining ring, a screw-threaded control shaft threadedly engaging said collar and provided with means interconnected with said plates for causing them to laterally shift in said boxes in response to rotation of said collar.

3. In a detachable coupling comprising first and second detachably connected coupling boxes defining a conduit for fluid flow communication therebetween, a multiple-part valve member including first and second slidable valve plates respectively carried by and laterally shiftable in said boxes in and between a conduit-closing position in which portions thereof seal off the ends of said conduit whereupon said boxes may be detached one from another, and a conduit-communicating position in which openings provided in said plates register with one another and with said conduit to permit fluid flow through said coupling, resilient sealing ring means carried in each of said boxes, spring means carried by said boxes and adapted to urge said sealing ring means toward and into sealing relationship with the associated valve plate, and means to seal said sealing ring means against the associated box, said last named means including a resilient gasket means in thrust-transmitting relationship between the spring means and the sealing ring means.

4. In a detachable coupling comprising first and second detachably connected coupling boxes defining a conduit for fluid flow communication therebetween, a multiple-part valve member including first and second slidable valve plates respectively carried by and laterally shiftable in said boxes in and between a conduit-closing position in which portions thereof seal off the ends of said conduit whereupon said boxes may be detached one from another, and a conduit-communicating position in which openings provided in said plates register with one another and with said conduit to permit fluid flow through said coupling, a sealing ring carried by each of said boxes and having an outer surface coordinated with the adjacent portion of the associated box to provide an annular recess of wedge-shaped section tapering toward the associated valve plate, a ring-like gasket means disposed in said annular recess, spring means carried by each of said boxes and adapted to exert pressure on said gasket in the direction in which said recess tapers to force the gasket tightly into said recess and seal said sealing ring with respect to said box.

5. In a detachable coupling comprising first and second detachably connected coupling boxes defining a conduit for fluid flow communication therebetween, a multiple-part valve member including first and second slidable valve plates respectively carried by and laterally shiftable in said boxes in and between a conduit-closing position in which portions thereof seal off the ends of said conduit whereupon said boxes may be detached one from another, and a conduit-communicating position in which openings provided in said plates register with one another and with said conduit to permit fluid flow through said coupling, resilient sealing ring means carried in each of said boxes, spring means carried by said boxes and adapted to urge said sealing ring means toward and into sealing relationship with the associated valve plate, a sleeve carried by each said box coaxially with the conduit-flow openings of the associated coupling box, said sleeve being at least substantially flush with and tangent to said openings, said spring means being disposed outside of said sleeve.

6. In a detachable coupling comprising first and second detachably connected coupling boxes defining a conduit for fluid flow communication therebetween, a multiple-part valve member including first and second slidable valve plates respectively carried by and laterally shiftable in said boxes in and between a conduit-closing position in which portions thereof seal off the ends of said conduit whereupon said boxes may be detached one from another, and a conduit-communicating position in which openings provided in said plates register with one another and with said conduit to permit fluid flow through said coupling, a resilient sealing ring carried by each valve plate around the opening in the plate, each said ring being of a lateral length at least twice the effective diameter of the conduit-communicating opening of the associated said valve plate to provide that it will sealingly encircle the periphery of the flow-opening of the associated coupling box irrespective of the lateral position of the said valve plate in said box.

7. In a detachable coupling comprising first and second detachably connected coupling boxes defining a conduit for fluid flow communication therebetween, a multiple-part valve member including first and second slidable valve plates respectively carried by and laterally shiftable in said boxes in and between a conduit-closing position in which portions thereof seal off the ends of said conduit whereupon said boxes may be detached one from another, and a conduit-communicating position in which openings provided in said plates register with one another and with said conduit to permit fluid flow through said coupling, a bushing carried by said first plate and having a forward portion projecting ahead of said first plate to be received within the said opening provided in said second plate, means locating said bushing with respect to said first plate, said means including the provision of the opening of said first plate in the face thereof remote from said second plate being enlarged, and the said bushing having a flange means disposed in said enlarged opening to present a shoulder limiting approach of said bushing toward the second plate, first and second sealing ring means carried by said first box and by said second box, respectively, first and second spring means carried by said first box and by said second box, respectively, said spring means operative to urge their associated sealing ring means into sealing relationship with opposite ends of said bushing.

8. In a detachable coupling comprising first and second detachably connected coupling boxes defining a conduit for fluid flow communication therebetween, a multiple-part valve member including first and second slidable valve-plates respectively carried by and laterally shiftable in said boxes in and between a conduit-closing position in which portions thereof seal off the ends of said conduit whereupon said boxes may be detached one from another, and a conduit-communicating position in which openings provided in said plates register with one another and with said conduit to permit fluid flow through said coupling, a bushing carried by said first plate and having a forward portion projecting ahead of said first plate to be received within the said opening provided in said second plate, the outer wall of said bushing, together with the adjacent wall defining the opening in which said bushing is received, comprising a first pair of mating surfaces extending peripherally about said bushing, the juxtaposed walls of said valve plates comprising a second pair of mating surfaces in a plane intersecting said first surface pair peripherally about said bushing, a ring-like sealing means disposed about said bushing at the peripheral intersection of the two pairs of mating surfaces, portions of said ring-like sealing means extending into each pair of mating surfaces to provide a seal therefor.

References Cited in the file of this patent

UNITED STATES PATENTS

| | | |
|---|---|---|
| 2,259,422 | Karlberg | Oct. 14, 1941 |
| 2,399,516 | Snyder | Apr. 30, 1946 |
| 2,403,620 | Snyder et al. | July 9, 1946 |
| 2,499,415 | Ralls | Mar. 7, 1950 |

FOREIGN PATENTS

| | | |
|---|---|---|
| 1,063,810 | France | Dec. 23, 1953 |